United States Patent [19]

Kim

[11] Patent Number: 5,746,108
[45] Date of Patent: May 5, 1998

[54] HYDRAULIC CONTROL SYSTEM OF TRANSFER SYSTEM FOR MACHINE TOOLS

[75] Inventor: Do Chul Kim, Kyungsangnam-do, Rep. of Korea

[73] Assignee: Hyundai Motor Company, Seoul, Rep. of Korea

[21] Appl. No.: 667,729

[22] Filed: Jun. 21, 1996

[30] Foreign Application Priority Data

Jun. 23, 1995 [KR] Rep. of Korea .................. 95-17137

[51] Int. Cl.$^6$ ........................................... F15B 11/044
[52] U.S. Cl. ................................. 91/444; 91/449
[58] Field of Search ...................... 91/443, 449, 450, 91/502, 444

[56] References Cited

U.S. PATENT DOCUMENTS

| | | | |
|---|---|---|---|
| 840,876 | 1/1907 | Steedman | 91/DIG. 2 |
| 2,837,875 | 6/1958 | Happel | 91/450 |
| 3,171,331 | 3/1965 | Samuel | 91/443 |
| 3,635,020 | 1/1972 | Mahlmann | 91/449 |
| 3,848,515 | 11/1974 | Gardiner et al. | 91/449 |

*Primary Examiner*—F. Daniel Lopez
*Attorney, Agent, or Firm*—Birch Stewart Kolasch & Birch, LLP

[57] ABSTRACT

Disclosed is a hydraulic control system of a transfer system for a machine tool, including a hydraulic pump for generating hydraulic pressure, a first directional control valve for controlling the flow direction of fluid from the hydraulic pump, a first flow speed control part located between the first direction control valve and a rotary cylinder to control the flow speed of fluid flowing therebetween, a second direction control valve controlling a flow direction of fluid fed from the first directional control valve and returned to a fluid tank, and a second flow speed control part for controlling flow speed of the returning fluid in accordance with a port variation of the second directional control valve.

7 Claims, 1 Drawing Sheet

HYDRAULIC CONTROL SYSTEM OF TRANSFER SYSTEM FOR MACHINE TOOLS

BACKGROUND

The present invention relates to a hydraulic control system of a transfer system for machine tools and, more particularly, to a hydraulic control system which can improve productivity by easily controlling the transfer speed of the work piece in accordance with working circumstances.

Generally, a transfer system of machine tools is controlled by a hydraulic control system, an example of which is disclosed in the Japanese laid-open publication No. S62-163602.

There is a need to adjust the speed of the transfer system of the machine tool in case where the work piece is dislocated or dropped on the floor.

For the foregoing reasons, there is a need for a hydraulic control system that can adjust the speed of a transfer system of a machine tool.

SUMMARY

The present invention is directed to a hydraulic control system that satisfies this need. The hydraulic control system comprises, a hydraulic pump for generating hydraulic pressure; a first directional control valve for controlling the flow directional of fluid from the hydraulic pump; a first flow speed control part, which is located between the first direction control valve and a transfer mechanism, for controlling the flow speed of fluid flowing therebetween; a second direction control valve controlling a flow direction of fluid fed from the first directional control valve and returned to a fluid tank; and a second flow speed control part for controlling flow speed of the returning fluid in accordance with a port variation of the second directional control valve.

According to a feature of the invention, the first directional control valve varies its ports in accordance with an ON/OFF operation of first and second solenoids which are controlled by a solenoid control unit.

According to another feature of the invention, the second directional control valve varies its ports according to an ON/OFF operation of a third solenoid valve, which is controlled by a solenoid control unit, and a fourth solenoid valve which is which is manually controlled.

According to still another feature of the invention, the first directional control valve is provided with a first port connected through a pressure supply line to the hydraulic pump in order to receive hydraulic pressure therefrom, a second port connected through a first work/release pressure line to one pressure chamber of the transfer mechanism in order to feed hydraulic pressure coming through the first port thereto or receive hydraulic pressure released therefrom, a third port connected through a second work/release pressure line to the other pressure chamber of the rotary cylinder in order to feed hydraulic pressure coming through the first port thereto or receive hydraulic pressure released therefrom, and a fourth port for feeding through a first release pressure line hydraulic pressure coming through the second or third port to the second directional control valve.

According to yet another feature of the invention, the second directional control valve is provided with a first port connected to the fourth port through the first release pressure line in order to receive hydraulic pressure therefrom; a second port connected through a second release pressure line to the reservoir tank in order to return through the second release pressure line hydraulic pressure coming through the first port to the reservoir tank when the third solenoid is controlled to an ON state by the SCU; and a third port connected through a third release pressure line to the reservoir tank in order to return hydraulic pressure through the third release pressure line to the reservoir tank when the fourth solenoid is manually controlled to an ON state.

Preferably, the first flow speed control part comprises a first variable pressure compensated flow control valve and a check valve located on the second work/release pressure line, as well as a second variable pressure compensated flow control valve and a check valve located on the first work/release pressure line.

Preferably, the second flow speed control part comprises a third pressure compensated flow control valve with a check valve.

According to another aspect of the present invention, the present invention provides a transfer system for a machine tool, comprising: a work piece transfer mechanism for transferring a work piece to a processing position or from the process position to other positions; means for controlling the flow direction of hydraulic pressure so that the work piece transfer mechanism can transfer the work piece to one of the positions; and means for controlling the transferring speed of the work piece transfer mechanism by use of hydraulic pressure fed from the means for controlling the flow direction of hydraulic pressure.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawing, wherein.

DESCRIPTION

Figure 1:
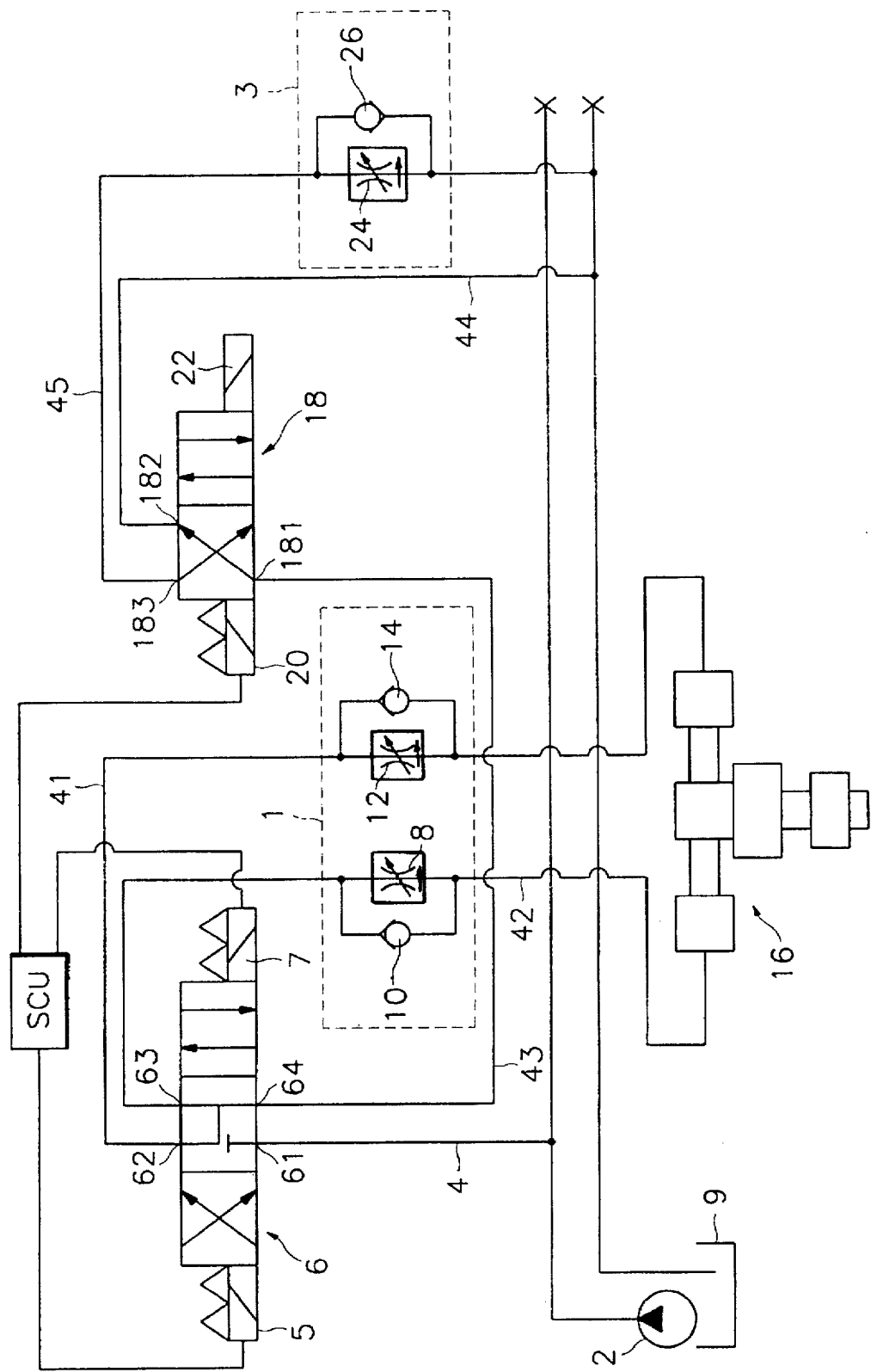
FIG. 1 is a hydraulic circuit diagram showing a hydraulic control system of a transfer system for a machine tool according to a preferred embodiment of the present invention.

A preferred embodiment of the present invention will now be described in detail with reference to the accompanying drawing.

Referring to FIG. 1, a hydraulic control system according to a preferred embodiment of the present invention comprises a hydraulic pump 2 for generating hydraulic pressure and a first directional control valve 6 for controlling the flow direction of fluid from the hydraulic pump.

The first directional control valve 6 varies its ports in accordance with the ON/OFF operation of each solenoid 5 and 7.

The hydraulic control system further comprises a first flow speed control part 1, which is located between the first directional control valve 6 and a transfer mechanism 16, for controlling the flow speed of fluid flowing therebetween, a second direction control valve 18 for controlling the flow direction of fluid fed from the first directional control valve 6 and returned to a fluid tank 9, and a second flow speed control part 3 for controlling the flow speed of the returning fluid in accordance with the port variation of the second directional control valve 18.

The transfer mechanism 16 is a conventional one which comprises a double-acting cylinder that reciprocates to reciprocately move a work piece. Conventionally, a rack is integrally formed with a piston rod within the cylinder, and a pinion meshes with the rack to transmit a rotational force to a drive-shaft roller of a conveyer. The second directional control valve 18 varies its ports according to an ON/OFF operation of a third solenoid valve 20, which is controlled by the SCU, or alternately, a solenoid valve 18, which is manually controlled.

The first directional control valve 6 is provided with a first port 61 which is connected through a pressure supply line 4 to the hydraulic pump 2 to receive hydraulic pressure therefrom. A second port 62 which is connected through a first work/release pressure line 41 to a right pressure chamber(not shown) of the transfer mechanism 16 so as to feed hydraulic pressure coming through the first port 61 thereto or to receive hydraulic pressure released therefrom A third port 63 is connected through a second work/release pressure line 42 to a left pressure chamber(not shown) of the transfer mechanism 16 so as to feed hydraulic pressure coming through the first port 61 thereto or to receive hydraulic pressure released therefrom. A fourth port 64 is for feeding through a first release pressure line 43 hydraulic pressure coming through the second or third port to the second directional control valve 18.

In FIG. 1, since the first directional control valve 6 is in a neutral state, whereby both the first and second solenoid valves 5 and 7 have been controlled to Off states by the SCU such that the first port 61 is disconnected with both the second and third ports 62 and 63, hydraulic pressure cannot be fed to the transfer mechanism 16.

On the one hand, the second directional control valve 18 is provided with a first port 181 which is connected to the fourth port 64 through the first release pressure line 43 to receive hydraulic pressure therefrom. A second port 182 which connected through a second release pressure line 44 to the reservoir tank 9 in order to return through the second release pressure line 44 hydraulic pressure coming through the first port 181 to the reservoir tank 9 when the third solenoid 20 is controlled to an ON state by the SCU. A third port 183 which is connected through a third release pressure line 45 to the reservoir tank 9 in order to return through the third release pressure line 45 hydraulic pressure to the reservoir tank 9 when the fourth solenoid 22 is manually controlled to an ON state.

The first flow speed control part 1 comprises a first variable pressure-compensated flow control valve 8 with a check valve 10 located on the second work/release pressure line 42. A second variable pressure compensated flow control valve 12 with a check valve 14 is located on the first work/release pressure line 41.

In addition, the second flow speed control part 3 is composed of a third pressure compensated flow control valve 24 with a check valve 26.

The first and second variable pressure compensated flow control valves 8 and 12 are set with a relatively high flow speed, while the third pressure compensated flow control valve 24 is set with a relatively low flow speed.

The operation of the hydraulic control system described above will now be described in detail with reference to the drawings.

During normal operation of the system, when an operating switch(not shown) is turned ON and the first solenoid 5 is controlled to an ON state by the SCU, hydraulic pressure pumped by the hydraulic pump 2 is fed to the first port 61 of the first directional control valve 6. At this point, since the solenoid 5 is in the ON state, the first port 61 connects to the third port 63, such that hydraulic pressure coming through the first port 61 leaves through the third port 63 and is then fed to the left pressure chamber (not shown) of the transfer mechanism 16 through the second work/release pressure line 42, displacing a rack gear(not shown) of the transfer mechanism 16 towards the right. While flowing along the line 42, the flow speed of the hydraulic pressure is controlled in response to a value set by the first variable pressure compensated flow control valve 8 with the check valve 10. Preferably, the flow speed value of the first flow control part 1 is pre-set at about 10 m/m.

When the rack gear is displaced towards the right as described above, hydraulic pressure within the right pressure chamber(not shown) of the transfer mechanism 16 is fed to the second port 62 of the first directional control valve(6). At this point, as described above, since the first solenoid 5 is in the ON state, hydraulic pressure coming through the second port 62 leaves through the fourth port 64 and subsequently flows into the first port 181 of the second directional control valve 18.

The hydraulic pressure fed to the first port 181 is, since the third solenoid 20 is controlled to an ON state by the SCU in the normal operating state, returned to the reservoir tank 9 through the second port 182 along the line 44. At this point, since there is no flow-control means on the line 44, the fluid can be returned quickly to the reservoir tank 9 as set at the first flow control part 1.

In this state, when the first solenoid 5 is controlled to an OFF state and the second solenoid 7 is controlled to an ON state by the SCU, hydraulic pressure coming through the first port 61 leaves through the second port 62 and is then fed to the right pressure chamber (not shown) of the transfer mechanism 16 through the first work/release pressure line 41, displacing a rack gear(not shown) of the transfer mechanism 16 towards the right. While flowing along the line 41, the flow speed of the hydraulic pressure is controlled in response to a value set by the second variable pressure compensated flow control valve 12 with the check valve 14. Preferably, the flow speed value of the first flow control part 1 is pre-set at about 10 m/m.

When the rack gear is displaced towards the left as described above, hydraulic pressure within the right pressure chamber(not shown) of the transfer mechanism 16 is fed into the third port 63 of the first directional control valve(6). At this point, as described above, since the second solenoid 7 is in the ON state, hydraulic pressure coming through the third port 63 leaves through the fourth port 64 and subsequently flows into the first port 181 of the second direction control valve 18.

The hydraulic pressure fed into the first port 181 is, since the third solenoid 20 is controlled to an ON state by the SCU in the normal operating state, returned to the reservoir tank through the second port 182 along the line 44. At this point, since there is no flowcontrol means along the line 44, the fluid can be returned quickly to the reservoir tank 9 as set at the first flow control part 1.

However, in the case where a work piece is dislocated or dropped on the floor, when the fourth solenoid 22 is turned ON by manually operating a switch(not shown) located on a main operating panel(not shown) of the machine tool, hydraulic pressure coming through the first port 181 of the second directional control valve 18 leaves through the third port 183 and subsequently then returns to the reservoir tank along the third pressure release line 45. At this point, since there is the second flow speed control part 3 composed of the third pressure compensated flow control valve 24 and the check valve 26 along the third pressure release line 45, the flow speed of hydraulic pressure is retarded by the second flow speed control part 3 as a value set at the part 3. Preferably, the flow speed value of the second flow speed control part 3 is set at about 1 m/m. As a result, since the speed of the hydraulic pressure returning to the reservoir tank 9 is retarded, the transfer system becomes retarded, and becomes easy to manipulate the work piece which is dislocated or dropped on the floor.

While the invention has been described in connection with what is presently considered to be most practical and preferred embodiments, it is to be understood that the invention is not limited to the disclosed embodiments, but, on the contrary, it is intended to cover various modifications and equivalent arrangements included within the spirit and scope of the appended claims.

What is claimed is:

1. A hydraulic control system of a transfer system for a machine tool, comprising:

a hydraulic pump for generating hydraulic pressure;

a first directional control valve for controlling the flow direction of fluid from the hydraulic pump;

a first flow speed control part, which is located between the first direction control valve and a transfer mechanism, for controlling the flow speed of fluid flowing therebetween;

a second direction control valve controlling a flow direction of fluid fed from the first directional control valve and returned to a fluid tank wherein the second directional control valve varies its ports according to an ON/OFF operation of a primary solenoid, which is controlled by a solenoid control unit, and a secondary solenoid which is manually controlled; and a second flow speed control part for controlling flow speed of the returning fluid in accordance with a port variation of the second directional control valve.

2. The hydraulic control system according to claim 1, wherein the first directional control valve varies its ports in accordance with an ON/OFF operation of third and fourth selenoids which are controlled by said solenoid control unit.

3. The hydraulic control system according to claim 1, wherein the first directional control valve is provided with a first port connected to a pressure supply line to the hydraulic pump in order to receive hydraulic pressure therefrom, a second port connected to a first work/release pressure line which is connected to one pressure chamber of the transfer mechanism in order to feed hydraulic pressure coming through the first port thereto or receive hydraulic pressure released therefrom, a third port connected to a second work/release pressure line which is connected to a second pressure chamber of the transfer mechanism in order to feed hydraulic pressure coming through the first port thereto or receive hydraulic pressure released therefrom, and a fourth port for feeding to a first release pressure line hydraulic pressure coming through the second or third port to the second directional control valve.

4. The hydraulic control system according to claim 1, wherein the second directional control valve is provided with a first port connected to a fourth port of said first directional control valve through a first release pressure line in order to receive hydraulic pressure therefrom; a second port connected through a second release pressure line to the reservoir tank in order to return through the second release pressure line hydraulic pressure coming through the first port to the reservoir tank when said primary solenoid of said second directional control valve is controlled to an on state by said solenoid control unit; and a third port connected through a third release pressure line to the reservoir tank in order to return hydraulic pressure through the third release pressure line to the reservoir tank when said secondary solenoid of said second directional control valve is manually controlled to an on state.

5. The hydraulic control system according to claim 3, wherein the first flow speed control part comprises a first variable pressure compensated flow control valve and a check valve located on the second work/release pressure line; and a second variable pressure compensated flow control valve and a check valve located on the first work/release pressure line.

6. The hydraulic control system according to claim 5, wherein the second flow speed control part comprises a third pressure compensated flow control valve with a check valve.

7. A transfer system for a machine tool, comprising:

a work piece transfer mechanism for transferring a work piece to a processing position or from the process position to other positions;

means for automatically controlling a flow direction of hydraulic pressure so that the work piece transfer mechanism can transfer the work piece to one of the positions;

a first means for controlling a transferring speed of the work piece transfer mechanism by use of hydraulic pressure fed to the means for controlling the flow direction of hydraulic pressure; and means for manually controlling the flow direction of hydraulic pressure so that when the work piece transfer mechanism is dislocated or dropped, a flow speed of said hydraulic pressure is retarded by a second means for controlling the transferring speed of the work piece to reduce the speed of the work piece.

* * * * *